Sept. 26, 1939.                C. C. FARMER                    2,173,937
                           RELEASE INSURING MEANS
                           Filed Jan. 28, 1939
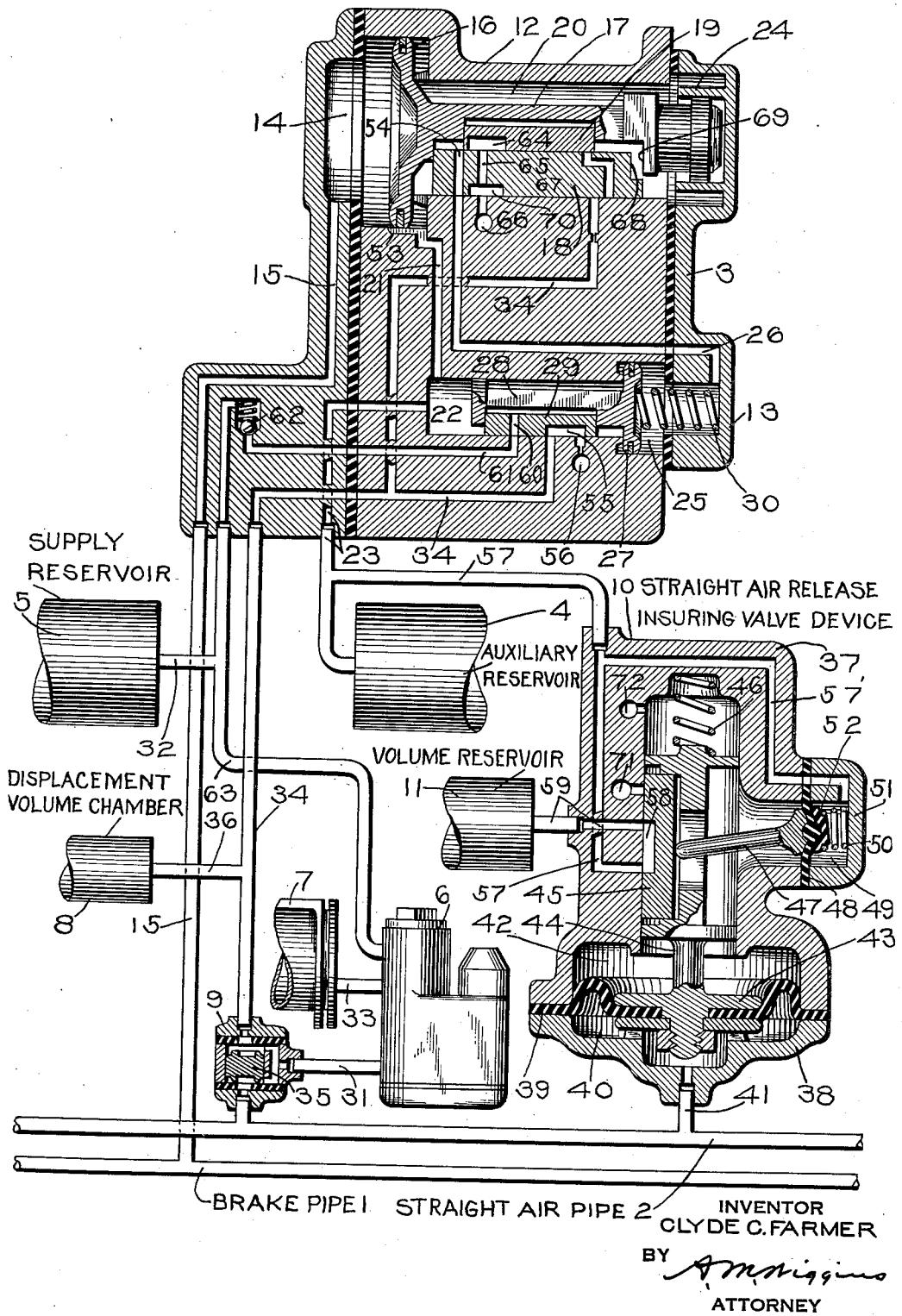
INVENTOR
CLYDE C. FARMER
BY
ATTORNEY Patented Sept. 26, 1939

2,173,937

UNITED STATES PATENT OFFICE 2,173,937

RELEASE INSURING MEANS

Clyde C. Farmer, Pittsburgh, Pa., assignor to The Westinghouse Air Brake Company, Wilmerding, Pa., a corporation of Pennsylvania Application January 28, 1939, Serial No. 253,355

11 Claims. (Cl. 303—26)

This invention relates to fluid pressure brake equipment for railway rolling stock and more particularly to that type of equipment shown in the prior joint application of Ellis E. Hewitt and Donald L. McNeal, Serial No. 160,562, filed August 24, 1937, which equipment is particularly adapted for use on trains operating in high speed service, and which may be controlled by either automatic operation or by straight air operation.

As shown in the above Hewitt and McNeal application, it is proposed to employ a double check valve device for controlling communication between the straight air pipe and brake application and release pipe or passage, and for also controlling communication between this application and release pipe or passage and the supply and release passage or pipe embodied in the automatic portion of the equipment. This check valve device functions to isolate the straight air pipe or passage and the supply and release passage or pipe of the automatic portion of the equipment from each other, so as to insure the proper control of the brakes either automatically or by straight air.

However, during a straight air application of the brakes, even though the check valve is seated for the purpose of isolating the supply and release passage of the automatic portion from the straight air pipe, there is a danger of leakage of fluid under pressure from the straight air pipe past the seated end of the valve to the supply passage of the automatic portion, and hence to any chambers connected therewith. This automatic supply passage and the connected chambers are in some forms of the equipment normally connected to the atmosphere through the medium of valve means embodied in the equalizing portion of the automatic portion of the equipment.

Further, in some forms of the above mentioned type of brake equipments, but not in the equipment covered by the aforementioned Hewitt and McNeal application, it has been discovered that when a straight air application of the brakes is being effected, the automatic portion of the equipment, due to unavoidable fluctuations of the brake pipe pressure, develops a tendency to operate from its normal release position to release lap position. In this position the valve means embodied in the equalizing valve device of the automatic portion of the equipment operates to close the atmospheric communication with the automatic supply passage and any chamber connected therewith. With the atmospheric communication closed there can be no escape of fluid under pressure which may leak past the check valve, into the automatic supply passage, so that the pressure of fluid in the passage and chambers in communication therewith will be increased according to the rate of leakage and duration of the straight air application of the brakes.

Now when, in releasing the straight air brake application of the brakes, the pressure of the straight air pipe has been reduced slightly below the pressure of fluid unintentionally built up and trapped in the automatic supply passage, the check valve will, by reason of such pressure, be caused to move from its straight air control position to a position where it cuts off the further release of fluid under pressure from the application and release passage by way of the straight air pipe, with the result that the brakes will be maintained applied with a brake cylinder pressure substantially equal to the pressure of fluid bottled up in the automatic supply passage.

This undesired brake application can only be released when the train is at a standstill by manual operation of the auxiliary reservoir release valve usually employed in these types of brake equipment and which functions to reduce the pressure of the fluid in the auxiliary reservoir. When said pressure has been reduced the required degree below the pressure of fluid in the brake pipe, the equalizing valve device of the automatic portion of the equipment will operate from release lap position to its normal release position and establish communication between the atmosphere and the automatic supply passage, so that fluid under pressure bottled up in said passage is permitted to escape, thereby permitting release of the brakes. The time required to release the brakes in this manner on the cars of the train where the brakes are thus unintentionally maintained applied results in objectional delay and thereby hinders the fast operating schedule called for in high speed service. Moreover, a consequence of a more serious nature is that the operator has no way of knowing that some of the brakes may be thus applied, so that while the train is in motion the accidentally applied brake shoes will drag on the wheels and cause unnecessary wear and the heating of both brake shoes and wheels. Even more serious damage is done when the unintentionally retained brake application is such that the wheels are caused to slide on the track rails and cause flat spots to be worn on the wheels. This is most likely to occur when the train is just put in motion after having been brought to a stop.

It is therefore an object of the present invention to provide a fluid pressure brake equipment of the above mentioned type with novel means whereby in effecting the release of a straight air application of the brakes any fluid under pressure which may leak from the straight air pipe to the supply passage of the automatic portion of the equipment during a straight air application of the brakes will be vented to the atmosphere, thus insuring a full and complete release of the brakes following every straight air application.

According to the invention this object is attained through the medium of novel means operative automatically in releasing a straight air application of the brakes for reducing auxiliary reservoir pressure sufficiently to insure the operation of the several parts of the equalizing valve device by brake pipe to their normal release position if these parts have in response to fluctuations in brake pipe pressure previously assumed a position in which the atmospheric communication from the automatic supply and release passage is closed.

Another object of the invention is to provide a fluid pressure brake equipment of the above mentioned type with a valve mechanism which maintains a connection open between the auxiliary reservoir and a volume reservoir when the brakes are released and when the automatic portion to the equipment is being operated to control the brakes, and which is operative upon the initiation of a straight air application of the brakes to first close such communication, and then open a communication from the volume reservoir to the atmosphere, to reduce the volume reservoir pressure to atmospheric pressure; and which is further operative upon a subsequent release of a straight air application of the brakes to establish the communication between the volume and auxiliary reservoirs to effect a reduction in auxiliary reservoir pressure for insuring operation of the equalizing portion to its normal release position in case it has accidentally assumed a position other than the normal release position.

Other objects and advantages will appear in the following more detailed description of the invention.

In the accompanying drawing, the single figure is a diagrammatic view mainly in section of fluid pressure brake apparatus embodying the invention.

As shown in the drawing the equipment may comprise a brake pipe 1, a straight air pipe 2, a brake controlling valve device 3, an auxiliary reservoir 4, a supply reservoir 5, a relay valve device 6, a brake cylinder 7, a displacement volume chamber 8, a double check valve device 9, a straight air release insuring valve device 10 and a volume reservoir 11.

The brake controlling valve device 3 may comprise an emergency portion and a brake pipe bracket which may be of substantially the same construction as the corresponding parts of the equipment shown in the aforementioned Hewitt and McNeal application, and may comprise an equalizing portion which may have many of the operating characteristics of the corresponding portions of the equipment shown in said application.

The present invention relates particularly to the control of the equalizing portion and in view of this and for the purpose of simplifying the showing and description of the invention, the emergency portion, the pipe bracket, and certain details of the equalizing portion not essential to a clear understanding of the invention have been omitted.

As shown in the drawing, the equalizing portion of the brake controlling valve device comprises an equalizing valve device 12 and a release relay valve device 13.

The equalizing valve device 12 may comprise a casing having a piston chamber 14 which is connected to the brake pipe 1 by way of a passage and pipe 15. The chamber 14 contains a piston 16 having a stem 17 adapted to operate a main slide valve 18 and an auxiliary slide valve 19 contained in a valve chamber 20, which is connected to the auxiliary reservoir 4 by way of a passage 21, valve chamber 22 of the release relay valve device 13 and a passage and pipe 23.

The rear end portion of the piston stem 17 is preferably of cylindrical form and is slidably guided by an annular flange 24 carried by the casing. This portion of the stem is substantially of the same construction and has the same operating characteristics as the corresponding parts of the "AB" equipment fully shown, described, and claimed in the patent to Clyde C. Farmer, Patent No. 2,031,213, issued February 18, 1936. In view of this and since these details are not essential to a clear understanding of the invention, they have been omitted in the present instance to simplify the showing and description of the invention.

The release relay valve device 13 may comprise a casing which, in the present embodiment of the invention, is integral with the casing of the equalizing valve device 12. This casing is provided with a piston chamber 25 which is connected to a passage 26 leading to the seat for the equalizing main slide valve 18 and contains a piston 27 having a stem 28 adapted to operate a slide valve 29 contained in valve chamber 22, which chamber is in constant open communication with the equalizing slide valve chamber 20 by way of passage 21, and in constant open communication with auxiliary reservoir 4 by way of passage and pipe 23. Also contained in the piston chamber 25 and interposed between and operatively engaging the piston 27 and casing is a spring 30 which normally maintains the piston and thereby the slide valve 29 in their proper release position, as shown in the accompanying drawing.

The relay valve device 6 is provided for the purpose of supplying fluid under pressure from the supply reservoir 5 to the brake cylinder 7 to effect an application of the brakes and also for the purpose of venting fluid under pressure from the brake cylinder to effect a release of the brakes, and is adapted to be controlled either by the straight air portion of the equipment or by the automatic portion.

This relay valve device may be of substantially the same construction as the relay valve device disclosed and claimed in the patent to Ellis E. Hewitt, No. 2,096,491 issued October 19, 1937, and for this reason the detailed description of this device in the present application is deemed unnecessary. It should here be mentioned that, with the several parts of the equipment in release position, the relay valve device connects the brake cylinder 7 to the atmosphere, and that when, in effecting an application of the brakes, fluid under pressure is supplied through the pipe 31 to the piston chamber of the relay valve device, the device functions to first close the atmospheric communication from the brake cylinder and to then supply fluid under pressure from the supply reservoir 5 to the brake cylinder by way of pipes 52, 63, and 33. When, in effecting a release of the brakes, fluid under pressure is vented from pipe 31 and consequently from the relay piston chamber, the relay valve device functions to vent fluid under pressure from the pipe 33 and brake cylinder to the atmosphere.

The double check valve device 9 is for the purpose of conditioning the equipment for either straight air or automatic operation and is automatically operative to its proper conditioning position when fluid under pressure is supplied thereto in initiating either a straight air or automatic application of the brakes.

This device may be substantially the same in construction as the corresponding device shown and described in the aforementioned Hewitt and McNeal application and is here briefly described as comprising a casing having a passage connected to the straight air pipe 2, a passage connected to the automatic application and release pipe 34 leading from the seat for the equalizing main slide valve 18, and a passage connected to the pipe 31 leading to the piston chamber of the relay valve device 6. Contained in the casing is a slidable check valve 35 which, when a straight air application of the brakes is being initiated moves to its upper seated position and thereby cuts off communication between the pipe 34 and the pipe 31 and establishes communication between the straight air pipe 2 and the pipe 31, and which, when an automatic application of the brakes is being effected assumes its lower seated position in which it establishes communication between the pipe 34 and the pipe 31 and closes communication between the straight air pipe and the passage and pipe 31.

The displacement volume reservoir 8 is provided for the purpose of adding volume to the piston chamber of the relay valve device 6 to control the operation of the relay valve device so as to provide the proper build up of brake cylinder pressure in substantially the same manner as the control has been effected by the use of the well known dummy brake cylinder. This device may be of substantially the same construction as the corresponding device shown, described, and claimed in application of Ellis E. Hewitt, Serial No. 156,693 filed July 31, 1937, but for simplification has been shown merely as a reservoir connected through a pipe 36 to the supply and release pipe 34 of the automatic portions of the equipment.

The straight air release insuring valve device 10, as will hereinafter more fully appear, is for the purpose of insuring a full release of brake cylinder pressure following the straight air application of the brakes. In the present embodiment of the invention the casing of the valve device 10 preferably comprises a body section 37 and a cap section 38 secured in any desired manner to the body section. Clamped between the casing sections 37 and 38 is a flexible diaphragm 39, at one side of which there is a chamber 40 connected through a passage and pipe 41 to the straight air pipe 2. At the opposite side of the diaphragm 39 there is a chamber 42, in which there is a diaphragm follower 43 having a stem 44 adapted to operate a slide valve 45, contained in the chamber 42. Interposed between and operatively engaging the stem 44 and the casing section 37 is a spring 46 which, at all times, tends to urge the follower member and diaphragm 39 toward their normal release position, in which position they are shown in the drawing.

Also contained in the slide valve chamber 42 is a loading strut 47 which, at one end pivotally engages the rear face of the slide valve 45, and which at its other end rockably contacts with one side of a flexible diaphragm 48 mounted in the casing. At the other side of the diaphragm 48 there is a chamber 49 which is connected through a passage 57', a pipe 57 and a pipe 23 to the auxiliary reservoir 4. Contained in the chamber 49 is a spring 50 which is interposed between and engages a cap 51 and a follower 52 in engagement with the diaphragm 48. The purpose of the spring 50 is to maintain the strut in close engagement with the slide valve 45 and the slide valve in engagement with its seat against unintentional vibration, but is not intended to load the valve to any appreciable extent, the loading being accomplished by means of fluid under pressure which is adapted to be supplied to the diaphragm chamber 49, all of which will appear in the following description of the operation of the equipment.

*Initial charging*

To charge the equipment the operator, through the medium of any suitable brake valve mechanism, causes fluid under pressure to be supplied to the brake pipe 1, and also causes the straight air pipe 2 to be connected to the atmosphere.

Fluid under pressure supplied to the brake pipe 1 flows therefrom through the pipe and passage 15 to the equalizing piston chamber 14 and from thence flows through a feed groove 53 to the equalizing slide valve chamber 20. From this chamber fluid under pressure flows through passage 21 to valve chamber 22 of the relay release valve device. Fluid under pressure also flows from this chamber 20 through a port 54 in the equalizing main slide valve 18 and passage 26 to the release relay piston chamber 25.

From this it will be seen that fluid pressure acting on opposite sides of the release relay piston 27 will be substantially equal to each other and that by reason of this spring 30 will maintain the piston, and thereby the release relay slide valve 29, in release position as shown in the drawing. With the slide valve in this position the passage 34 and pipe 34 and thereby the volume chamber 8 are connected to the atmosphere by way of cavity 55 in the slide valve 29 and a passage 56, the cavity connecting the passage 34 to the passage 56.

If the check valve 35 of the double check valve device 9 should be in a position for straight air control, that is, in its upper seated position, the piston chamber of the relay valve device 6 is connected to the atmosphere by way of pipe 31 and the straight air pipe 2, but if it is in a position for automatic control, that is, in its lower seated position, piston chamber is connected to the atmosphere by way of pipe 31, pipe and passage 34, cavity 55 in the release relay slide valve 29, and passage 56. With the piston chamber of the relay valve device connected to the atmosphere through either of the two paths just traced, the relay valve device 6 establishes communication from the brake cylinder 7 to the atmosphere in the usual manner.

From the valve chamber 22 of the release relay valve device, fluid under pressure flows through passage and pipe 23 to the auxiliary reservoir 4, and to the volume reservoir 11 by way of pipe and passage 57, cavity 58 in the slide valve 45 of the release insuring valve device 10 and passage and pipe 59. Fluid under pressure also flows through passage 57' to the diaphragm chamber 49 of the release insuring valve device

10. The pressure of fluid in chamber 49 acts through the medium of the diaphragm 48 and strut 47 to maintain the slide valve 45 in close contact with the slide valve seat against the tendency of fluid at auxiliary reservoir pressure in cavity 58 to raise the valve from its seat, thus insuring against leakage of auxiliary reservoir fluid to the valve chamber 42 which is constantly open to the atmosphere through the passage 72.

Since the straight air pipe 2 is connected to the atmosphere by way of the brake valve device, the diaphragm chamber 40 of the release insuring valve device 10 will be connected to the atmosphere by way of passage and pipe 41. Therefore, the spring 46 acts to maintain the diaphragm 39 and thereby the slide valve 45 in release position, as shown in the drawing.

Fluid under pressure flows from the valve chamber 22 to the supply reservoir 5 by way of a port 60 in the release slide valve 29, a passage 61, past a ball check valve 62, a passage and pipe 63 and pipe 32.

*Automatic service application of the brakes*

An automatic application of the brakes is initiated by effecting a gradual reduction in brake pipe pressure by the use of the brake valve mechanism hereinbefore mentioned. Since, as before described, the brake pipe 1 is in communication with the equalizing piston chamber 14, the pressure of fluid in this chamber gradually reduces with the brake pipe pressure.

Upon this reduction in the pressure of fluid in the equalizing piston chamber 14, the pressure of fluid in the equalizing slide valve chamber 20 causes the equalizing piston 16 to move outwardly in a direction towards the left hand, and through the medium of the piston stem 17 shifts the auxiliary slide valve 19 relative to the main slide valve 18 until a shoulder 69 with which the rear end of the piston stem 17 is provided engages the rear surface 68 of the main slide valve and then shifts both slide valves in unison to application position. This piston as it is thus being moved cuts off communication from the equalizing piston chamber to the slide valve chamber by way of the feed groove 53 so as to prevent back flow of fluid under pressure from the valve chamber to the piston chamber. At substantially the same time as the feed groove is thus closed to the piston chamber 14, the auxiliary slide valve uncovers the usual service port 67 to the valve chamber 20, and following this a cavity 64 in the auxiliary slide valve connects a port 65 in the main slide valve to the port 54 in the main slide valve, which connection is made before the shoulder 69 engages the surface 68 of the main slide valve. The port 65 is open to a tail cavity 70 in the main slide valve and this cavity is open to a passage 66 leading to the atmosphere so that when the cavity 64 connects the ports 54 and 65 fluid under pressure is vented from the piston chamber 25 of the relay release valve device 13. The venting of this chamber 25 will be at a rapid rate so that the pressure of fluid in valve chamber 22 will cause the piston 27 and thereby the slide valve 29 to quickly move from release to application position in which latter position the slide valve laps the passage 34 to prevent the flow of fluid from this passage to the atmosphere by way of the exhaust passage 56. The slide valve 29 in this position cuts off the charging communication from the valve chamber 22 to the passage 61 leading to the supply reservoir 5.

It should here be mentioned when an automatic application of the brakes is being effected the several parts of the straight air release insuring valve device 10 remains in its normal position, as shown in the drawing.

With the several parts of the equalizing valve device in application position, the service port 67 therein is open to the passage 34, so that fluid under pressure now flows from the equalizing piston chamber 20, the connected auxiliary reservoir 4 and volume reservoir 11, and also from the chamber 49 of the release insuring valve device 10 to the displacement reservoir 8, and check valve device 9. Fluid under pressure thus supplied to the check valve device 9 causes the check valve 35 to move to the position illustrated, if it is not already thus positioned, to permit fluid under pressure to flow from pipe 34 to pipe 31 and thereby to the piston chamber of the relay valve device 6. The check valve in this position closes communication between the straight air pipe 2 and the pipe 31. The movement of the double check valve to the position will be prompt since the straight air pipe side of the valve is connected to the atmosphere by way of the straight air pipe 2 and is thereby at atmospheric pressure.

Fluid under pressure thus supplied to the piston chamber of the relay valve device 6 causing the relay valve device to operate to close the exhaust communication from the brake cylinder to the atmosphere and to open the supply communication to permit fluid under pressure to flow from the supply reservoir 5 to the brake cylinder 7.

With the main slide valve in this position a tail cavity 70 of the port 65 maintains the passage 26 connected to the atmosphere passage 66, so that the piston chamber 25 of the release relay valve device is maintained at atmospheric pressure so long as the equalizing main slide valve remains in application position.

*Automatic release of the service application of the brakes*

To effect a release of the brakes following a service application thereof, fluid under pressure is supplied to brake pipe 1 and flows therefrom to the equalizing piston chamber 14 in the same manner as has before been described in connection with the initial charging of the equipment. This causes the several parts of the equalizing valve device to move to their release position as shown in the drawing.

With the auxiliary slide valve 19 and main slide valve 18 of the equalizing valve device in release position the port 54 in the main slide valve is in registration with passage 26 and is open to the equalizing slide valve chamber 20, so that fluid under pressure now flows from this chamber to the piston chamber 25 of the release relay valve device 13. When the pressure of fluid in this chamber becomes equal to auxiliary reservoir pressure in chamber 22, the spring 30 acts to shift the release relay piston 27 and thereby the slide valve 29 to release position as shown in the drawing. In this position the cavity 55 in the slide valve 29 connects passage 34 to the passage 56 so that fluid under pressure is vented from the displacement reservoir 8 and the piston chamber of the relay valve device 6. Further, with the slide valve 29 in this position, the port 60 therein registers with passage 61, so that fluid under pressure flows from the chamber 22 to the supply reservoir 5. Upon the venting of the piston chamber of the relay valve device 6 the device is caused to function to vent fluid under pressure from the brake cylinder to the atmosphere, thus effecting the release of the brakes.

*Straight air application of the brakes*

When it is desired to effect a straight air application of the brakes, the operator, by the use of his brake controlling mechanism, causes fluid under pressure to be supplied to the straight air pipe 2, while maintaining the brake pipe charged to normal pressure value.

From the straight air pipe 2, fluid under pressure flows to the double check valve device 9 and causes the check valve 35 thereof to assume its upper position. In this position the check valve cuts off communication between the straight air pipe and the pipe 31, so that fluid under pressure flows from the straight air pipe to the piston chamber of the relay valve device 6 causing this valve device to function to supply fluid under pressure from the supply reservoir 5 to the brake cylinder 7 to effect an application of the brakes, the increase in brake cylinder pressure being commensurate with the increase in the relay piston chamber pressure.

Fluid under pressure being supplied to the straight air pipe also flows through pipe and passage 41 to the diaphragm chamber 40 of the straight air release insuring valve device 10, and as the pressure of fluid in this chamber increases the diaphragm 39 flexes upwardly, as viewed in the accompanying drawing, against the opposing action of the spring 46 shifting the follower member 44 and slide valve 45 in the same direction.

With the straight air release insuring valve device in application position, the slide valve 45 is shifted to a position where the passage and pipe 57 is blanked and the cavity 58 is moved into connecting relationship with the port 59 and a port 71 which is in direct communication with the atmosphere. The reason for establishing the above communication during a straight application of the brakes will now be described.

During a straight air application of the brakes it is essential, in order to insure a complete subsequent release of the brakes, that the displacement volume reservoir 8, passage 36 and pipe and passage 34 be maintained connected to the atmosphere in order to prevent fluid under pressure which may leak past the check valve 35 of the double check valve device 9 from building up a pressure in these volumes. This communication, as shown, is normally established by the cavity 55 in the relay slide valve 28 connecting the passage 34 and 56 together and is maintained so long as the pressure or fluid on opposite sides of the release relay remains substantially equal to each other.

However, it has been discovered that when a straight air application of the brakes is being effected, the brake pipe pressure, due to erratic operation of the feed valve device, may be reduced sufficiently to cause the equalizing piston 16 and thereby the associated auxiliary slide valve 19 to unintentionally move outwardly relative to the main slide valve 18 from release position. When this occurs the cavity 64 in the auxiliary slide valve connects the port 26 and consequently the passage 26 and connected release relay piston chamber 25 to the port 64 which is open to the atmosphere through cavity 70 and passage 66. With this communication established fluid under pressure is vented from the chamber 25 and as a result the release relay piston 27 and associated slide valve 29 are caused to assume application position in which the slide valve laps passage 34 thereby cutting off communication from this passage to the atmospheric passage 56. It will here be noted that with this atmospheric communication closed and with the release insuring valve device absent, the leakage of fluid past the check valve 35 would build up in the passage 34 and volume connected thereto and would be maintained during a straight air application and while the release of the brakes is taking place.

If it were not for the straight air release insuring valve device 10, leakage of fluid past the check valve 35 would act to prevent the complete release of the straight air application of the brakes as will be apparent from the following description.

When it is desired to release a straight air application of the brakes, fluid under pressure is vented from the straight air pipe 2 and consequently from the piston chamber of the relay valve device 6 which causes the relay valve device to function to release fluid under pressure from the brake cylinder to atmosphere.

When in effecting a straight air release of the brakes with leakage fluid trapped or bottled up in the volume reservoir 8, pipe 36 and passage and pipe 34 and the straight air pipe has been reduced slightly below that of the trapped or bottled up leakage fluid, the check valve 35 of the double check valve device 9, under the influence of the pressure of the trapped or bottled up leakage fluid, will be shifted from its straight air control position to its automatic control position, thus cutting off the further release flow of fluid from the piston chamber of the relay valve device 6 and establishing communication from the pipe 34 to the piston chamber. From this it will be seen that the brakes, instead of being entirely released as intended, will be maintained applied with a force commensurate with the pressure of the leakage fluid in the displacement reservoir 8, pipe 36, and pipe and passage 34. The operator has no way of knowing that this undesirable condition exists when he again causes the train to be put in motion, with the result that the brake shoes and wheels will be unduly worn and excessively heated during the remainder of the run. But even more serious damage is done when the retained brake application is such as to cause the wheels to slide on the track rails, which sliding action causes flat spots to be worn on the wheels necessitating the replacement of the wheels.

According to the invention this undesirable action cannot occur for the reason that when a straight air application of the brakes is being released, the straight air release insuring valve device 10 functions in response to a predetermined reduction in the straight air pipe pressure to open a communication from the auxiliary reservoir 4 to the volume reservoir 11 by way of pipe and passage 57, cavity 58 of the slide valve 45 in the release insuring valve device 10 and pipe and passage 59.

Since the volume reservoir pressure has been previously reduced to atmospheric pressure, the flow of fluid thereto from the auxiliary reservoir through the circuit just traced will effect a definite reduction in auxiliary reservoir pressure and consequently in the equalizing valve chamber 20. It should here be mentioned that the volume of the volume reservoir is such that it will reduce auxiliary reservoir pressure below any expected but unintentional reduction in brake pipe pressure which may be caused by an erratic feed valve device, so that if the equalizing piston 16 and auxiliary slide valve 19 has during the application of the brakes assumed the position in which it causes the piston chamber 25 of the relay release valve device to be vented, the equalizing piston and auxiliary slide valve will now be caused to quickly move to their normal release position and as a result will cause the relay release valve device to function to establish the atmospheric communication from the passage 34. From this it will be seen that any build up of pressure in passage 34 during a straight air application of the brakes will be reduced to atmospheric pressure upon a subsequent release of the brakes, thus insuring the complete release.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a combined automatic and straight air brake equipment of the type having an automatic portion comprising a brake pipe, a chamber normally charged with fluid under pressure from the brake pipe, and a brake controlling valve device subject to the opposing pressures of the brake pipe and chamber and operative upon a reduction in brake pipe pressure to effect an automatic application of the brakes and operative upon a subsequent increase in brake pipe pressure to effect the release of the brakes, and also having a straight air portion comprising a straight air pipe an increase in the pressure of which is adapted to effect a straight air application of the brakes and a reduction in the pressure of which is adapted to effect the release of the straight air application of the brakes, in combination, means adapted when the brakes are being controlled by straight air for normally isolating the automatic portion from the straight air portion, and means included in said straight air portion of the equipment operative upon a reduction in the straight air pipe pressure in releasing the straight air application of the brakes for effecting a reduction in the pressure of fluid in said chamber.

2. In a combined automatic and straight air brake equipment of the type having an automatic portion comprising a brake pipe, a chamber normally charged with fluid under pressure from the brake pipe, and a brake controlling valve device subject to the opposing pressures of the brake pipe and chamber and operative upon a reduction in brake pipe pressure to effect an automatic application of the brakes and operative upon a subsequent increase in brake pipe pressure to effect the release of the brakes, and also having a straight air portion comprising a straight air pipe an increase in the pressure of which is adapted to effect a straight air application of the brakes and a reduction in the pressure of which is adapted to effect the release of the straight air application of the brakes, in combination, means adapted when the brakes are being controlled by straight air for normally isolating the automatic portion from the straight air portion, and a straight air release insuring valve device operative upon a reduction in straight air pipe pressure in effecting the release of a straight air application of the brakes for reducing the pressure of fluid in said chamber by an amount in excess of any possible reduction in brake pipe pressure during unintentional fluctuation in brake pipe pressure.

3. In a combined automatic and straight air brake equipment, in combination, a brake pipe, a chamber normally charged with fluid under pressure from the brake pipe, a brake controlling valve device subject to the opposing pressures of the brake pipe and chamber and operative upon a reduction in brake pipe pressure to effect an application of the brakes and operative upon a subsequent increase in brake pipe pressure to effect the release of the brakes, a straight air pipe an increase in the pressure of which effects a straight air application of the brakes and a subsequent decrease in the pressure of which effects the release of the brakes, and means subject to the pressure of fluid in the straight air pipe and operative upon a decrease in the pressure of fluid in the straight air pipe in releasing a straight air application of the brakes for reducing the pressure of fluid in said chamber.

4. In a combined automatic and straight air brake equipment, in combination, a brake pipe, a chamber normally charged with fluid under pressure from the brake pipe, a brake controlling valve device subject to the opposing pressures of the brake pipe and chamber and operative upon a reduction in brake pipe pressure to effect an application of the brakes and operative upon a subsequent increase in brake pipe pressure to effect the release of the brakes, a straight air pipe an increase in the pressure of which effects a straight air application of the brakes and a subsequent decrease in the pressure of which effects the release of the brakes, a volume reservoir normally communicating with said chamber, means operative upon an increase in straight air pipe pressure for closing the communication between said volume reservoir and chamber and for venting fluid under pressure from said volume reservoir, said means being operative upon a subsequent decrease in the straight air pipe pressure in releasing a straight air application of the brakes for establishing the communication between the chamber and the volume reservoir to effect a reduction in pressure in said chamber.

5. In a combined automatic and straight air brake equipment of the type having an automatic portion comprising a brake pipe, an auxiliary reservoir, a chamber in constant communication with said auxiliary reservoir normally charged with fluid under pressure from the brake pipe, and a brake controlling valve device subject to the opposing pressures of the brake pipe and auxiliary reservoir and operative upon a reduction in brake pipe pressure to effect an automatic application of the brakes and operative upon a subsequent increase in brake pipe to effect the release of the brakes, and also having a straight air portion comprising a straight air pipe an increase in the pressure of which is adapted to effect a straight air application of the brakes and a reduction in the pressure of which is adapted to effect the release of the straight air application of the brakes, in combination, a check valve adapted when the brakes are being controlled by straight air for normally isolating the automatic portion from the straight air portion, and a straight air release insuring valve device operative upon a reduction in straight air pipe pressure in effecting the release of a straight air application of the brakes for reducing the pressure of fluid in said auxiliary reservoir.

6. In a combined automatic and straight air brake equipment of the type having an automatic portion comprising a brake pipe, an auxiliary reservoir, a chamber in constant communication with said auxiliary reservoir normally charged with fluid under pressure from the brake pipe, and a brake controlling valve device subject to the opposing pressures of the brake pipe and auxiliary reservoir and operative upon a reduction in brake pipe pressure to effect an automatic application of the brakes and operative upon a subsequent increase in brake pipe to effect the release of the brakes, and also having a straight air portion comprising a straight air pipe an increase in the pressure of which is adapted to effect a straight air application of the brakes and a reduction in the pressure of which is adapted to effect the release of the straight air application of the brakes, in combination, a check valve adapted when the brakes are being controlled by straight air for normally isolating the automatic portion from the straight air portion, a volume reservoir, and a straight air release insuring valve device operative upon a reduction in straight air pipe pressure in releasing the straight air application of the brakes to connect said volume reservoir to said auxiliary reservoir for effecting a reduction in the pressure of fluid in said auxiliary reservoir.

7. In a combined automatic and straight air brake equipment, in combination, a brake pipe, a chamber normally charged with fluid under pressure from the brake pipe, a brake controlling valve device subject to the opposing pressures of the brake pipe and chamber and operative upon a reduction in brake pipe pressure to effect an application of the brakes and operative upon a subsequent increase in brake pipe pressure to effect the release of the brakes, a straight air pipe an increase in the pressure of which effects a straight air application of the brakes and a subsequent decrease in the pressure of which effects the release of the brakes, a volume reservoir normally communicating with said chamber, a straight air release insuring valve device comprising a valve and a movable abutment operative upon an increase in straight air pipe pressure to actuate said valve for closing the communication between said volume reservoir and said chamber and for venting fluid under pressure from said volume reservoir, said valve device being operative upon a subsequent decrease in the straight air pipe pressure in releasing a straight air application of the brakes for establishing the communication between the chamber and the volume reservoir to effect a reduction in pressure in said auxiliary reservoir.

8. In a combined automatic and straight air brake equipment, in combination, a brake pipe, a chamber normally charged with fluid under pressure from the brake pipe, a brake controlling valve device subject to the opposing pressures of the brake pipe and chamber and operative upon a reduction in brake pipe pressure to effect an application of the brakes and operative upon a subsequent increase in the brake pipe pressure to effect the release of the brakes, a straight air pipe an increase in the pressure of which effects a straight air application of the brakes and a subsequent decrease in the pressure of which effects the release of the brakes, a volume reservoir normally communicating with said chamber, means operative upon an increase in straight air pipe pressure for closing the communication between said volume reservoir and chamber and for venting fluid under pressure from said volume reservoir, said means being operative upon a subsequent decrease in the straight air pipe pressure in releasing a straight air application of the brakes for establishing the communication between the chamber and the volume reservoir to effect a reduction in pressure in said chamber, said means maintaining said communication between the chamber and the volume reservoir closed when an automatic application of the brakes is being effected.

9. The combination with a combined automatic and a straight air brake equipment comprising an automatic brake controlling valve device, a brake pipe, an auxiliary reservoir, a volume reservoir, a straight air pipe, fluid pressure controlled means normally establishing communication between said auxiliary reservoir and said volume reservoir and being operative upon a straight air application of the brakes for closing said communciation and for establishing an atmospheric communication from the volume reservoir, said means being operative in releasing the straight air application of the brakes for closing this atmospheric communication and for opening the communication between the auxiliary reservoir and volume reservoir to insure a definite reduction in auxiliary reservoir pressure during a release of the straight air application of the brakes.

10. In a combined automatic and straight air brake equipment, in combination, a brake controlling conduit through which fluid under pressure is supplied to effect an application of the brakes, a straight air pipe through which fluid under pressure is supplied to said conduit to effect a straight air application of the brakes, a passage through which fluid under pressure is supplied to said conduit in effecting an automatic application of the brakes, a valve operative by fluid under pressure supplied to the straight air pipe in initiating a straight air application of the brakes for cutting off communication between said passage and conduit, in combination, a brake pipe, an auxiliary reservoir, a volume reservoir, a brake controlling valve mechanism normally establishing an atmospheric communication from said passage and operative upon a reduction in brake pipe pressure for closing the atmosphere communication, means for normally opening communication between the auxiliary reservoir and said volume reservoir and operative upon the initiation of a straight air application of the brakes for closing said communication and for connecting the volume reservoir to the atmosphere and operative upon a straight air release of the brakes for opening said communication, said means being ineffective to close the communication between said auxiliary reservoir and said volume reservoir when an automatic application of the brakes is being effected.

11. In a combined automatic and straight air brake equipment having a communication through which brake controlling fluid is supplied in effecting an automatic application of the brakes and having another communication through which brake applying fluid is supplied in effecting a straight air application of the brakes, valve means for isolating each communication from the other, a brake controlling valve device responsive to brake pipe pressure having a release valve normally connecting the first mentioned communication to the atmosphere and operative in effecting an automatic application of the brakes for closing the atmospheric connection from the communication, a volume reservoir which is adapted to be at atmospheric pressure when a straight air application of the brakes is effected, an auxiliary reservoir charged with fluid under pressure, and means for connecting said auxiliary reservoir and said volume reservoir together during the release of a straight air application, to insure a sufficient reduction in auxiliary reservoir pressure to cause the release valve of the brake controlling valve device to assume release position and thereby connect the first mentioned communication to the atmosphere, if during the straight air application of the brakes, said release valve of the brake controlling valve device has unintentionally moved from its normal release position.

CLYDE C. FARMER.